(12) United States Patent
von Blücher et al.

(10) Patent No.: US 8,062,411 B2
(45) Date of Patent: Nov. 22, 2011

(54) ADSORPTIVE FILTERING MATERIAL WITH INTEGRATED PARTICLE-AND/OR AEROSOL-FILTERING FUNCTION AND USE THEREOF

(75) Inventors: Hasso von Blücher, Erkrath (DE); Peter Heinrich, Moers (DE); Stefan Kämper, Ratingen (DE); Anna Varga-Molnar, Mönchengladbach (DE)

(73) Assignee: Blucher GmbH, Erkrath (DE)

( * ) Notice: Subject to any disclaimer, the term of this patent is extended or adjusted under 35 U.S.C. 154(b) by 326 days.

(21) Appl. No.: 11/710,777

(22) Filed: Feb. 26, 2007

(65) Prior Publication Data

US 2007/0240576 A1    Oct. 18, 2007

(30) Foreign Application Priority Data

Feb. 27, 2006   (DE) .......................... 10 2006 009 487
May 11, 2006    (DE) .......................... 10 2006 021 905

(51) Int. Cl.
    *B01D 59/26*   (2006.01)
(52) U.S. Cl. ................. 96/135; 96/108; 96/134; 55/315; 55/318
(58) Field of Classification Search ...... 96/108, 96/134, 135; 55/315, 318
    See application file for complete search history.

(56) References Cited

U.S. PATENT DOCUMENTS

| | | | | |
|---|---|---|---|---|
| 2,690,415 | A * | 9/1954 | Shuler ............................ | 604/359 |
| 3,997,447 | A * | 12/1976 | Breton et al. ............... | 210/360.2 |
| 4,217,386 | A * | 8/1980 | Arons et al. ................... | 428/198 |
| 4,643,182 | A * | 2/1987 | Klein ....................... | 128/201.25 |
| 4,714,647 | A * | 12/1987 | Shipp et al. ................... | 428/212 |
| 4,791,978 | A * | 12/1988 | Fishler .......................... | 164/437 |
| 4,824,451 | A * | 4/1989 | Vogt et al. ....................... | 55/528 |
| 4,843,739 | A * | 7/1989 | von Blucher et al. ............. | 36/44 |
| 4,869,947 | A * | 9/1989 | Kirayoglu ..................... | 428/198 |
| 4,992,084 | A * | 2/1991 | Von Blucher et al. .......... | 96/131 |
| 5,092,990 | A * | 3/1992 | Muramatsu et al. .......... | 210/136 |
| 5,350,443 | A * | 9/1994 | von Blucher et al. .......... | 96/135 |
| 5,376,554 | A * | 12/1994 | Vo-Dinh ....................... | 436/104 |
| 5,609,947 | A * | 3/1997 | Kamei et al. ................. | 428/212 |
| 6,070,578 | A * | 6/2000 | Baughman et al. ...... | 128/205.27 |

(Continued)

FOREIGN PATENT DOCUMENTS

CA       2 504 367       11/2005

(Continued)

OTHER PUBLICATIONS

Felder et al., Elementary Principles of Chemical Process, 3rd Edition, John Wiley & Sons, Inc., 2000.*

(Continued)

*Primary Examiner* — Jason M Greene
*Assistant Examiner* — Anthony Shumate
(74) *Attorney, Agent, or Firm* — Woodard Emhardt Moriarty McNett & Henry LLP

(57) ABSTRACT

The invention relates to an adsorptive filtering material endowed with integrated particle- and/or aerosol-protection and with protective performance with regard to biological and/or chemical noxiants, in particular biological and/or chemical warfare agents, the adsorptive filtering material having a multilayered construction comprising a support layer, an adsorptive layer associated to and preferably fixed to the support layer, and optionally a covering layer disposed on that side of the adsorptive layer that is remote from the support layer, wherein the adsorptive filtering material is additionally equipped with a particle- and/or aerosol-filtering layer. The adsorptive filtering material is particularly useful in NBC protective materials of any kind (as in protective apparel for example) and for producing filters.

14 Claims, 1 Drawing Sheet

U.S. PATENT DOCUMENTS

| | | | |
|---|---|---|---|
| 6,074,738 A * | 6/2000 | von Fragstein et al. | 428/315.9 |
| 6,463,397 B1 * | 10/2002 | Cohen et al. | 702/140 |
| 6,641,773 B2 | 11/2003 | Kleinmeyer et al. | |
| 2002/0119723 A1 | 8/2002 | Heinrich et al. | 442/389 |
| 2003/0046913 A1 * | 3/2003 | Suzuki et al. | 55/486 |
| 2004/0116025 A1 | 6/2004 | Gogins et al. | 442/340 |
| 2005/0076541 A1 * | 4/2005 | von Blucher | 36/113 |
| 2006/0016340 A1 | 1/2006 | Braeunling et al. | 96/134 |
| 2007/0004301 A1 * | 1/2007 | Heinrich et al. | 442/121 |
| 2007/0134483 A1 | 6/2007 | Böhringer et al. | 428/297.4 |
| 2007/0181001 A1 | 8/2007 | Böhringer et al. | 96/154 |

FOREIGN PATENT DOCUMENTS

| | | |
|---|---|---|
| CA | 2 510 710 | 1/2006 |
| DE | 41 34 222 A1 | 4/1993 |
| DE | 299 16 949 U1 | 2/2000 |
| DE | 102 49 998 B3 | 5/2004 |
| DE | 203 06 251 U1 | 6/2004 |
| DE | 103 56 776 A1 | 7/2005 |
| DE | 20 2005 018 547 U1 | 1/2007 |
| DE | 10 2005 056 537 U1 | 5/2007 |
| EP | 0594154 A1 * | 4/1994 |
| EP | 1 433 394 A1 | 6/2004 |
| EP | 1 618 938 A1 | 1/2006 |
| FR | 2 806 320 | 9/2001 |
| JP | 2002 292227 | 10/2002 |
| JP | 2003 506203 | 2/2003 |
| WO | WO 2005/053838 A1 | 6/2005 |

OTHER PUBLICATIONS

Kim et al. (Characteristics of Nylon 6 nanofilter for removing ultra fine particles) Korean J. Chem. Eng., 25(2), 368-372 (2008).*

The American Heritage Dictionary of the English Language: Fourth Edition. 2000.*

Felder et al., Elementary Principles of Chemical Process, 3rd Edition, John Wiley & Sons, Inc., 2000, front inside cover.*

Römpp Chemielexikon, 10th edition, Georg Thieme Verlag Stuttgart/ New York, vol. 6, 1999, pp. 4889/4890, headword: "Vliesstoffe".

Römpp Chemielexikon, loc. cit., pp. 4477 to 4479, headword: "Textilfasern".

McCullough et al. "A Comparison of Standard Methods for Measuring Water Vapor Permeability of Fabrics" in *Meas. Sci. Technol.* [*Measurements Science and Technology*], 14, 1402-1408, Aug. 2003.

* cited by examiner

ADSORPTIVE FILTERING MATERIAL WITH INTEGRATED PARTICLE-AND/OR AEROSOL-FILTERING FUNCTION AND USE THEREOF

CROSS REFERENCES TO RELATED APPLICATIONS

This application claims priority to German Patent Application No. DE 10 2006 009 487.5, filed Feb. 27, 2006, and also claims priority to German Patent Application No. DE 10 2006 021 905.8, filed May 11, 2006, entitled "ADSORPTIVE FILTERING MATERIAL WITH INTEGRATED PARTICLE-AND/OR AEROSOL-FILTERING FUNCTION AND USE THEREOF". Both references are expressly incorporated by reference herein, in their entirety.

BACKGROUND OF THE INVENTION

The present invention relates to an adsorptive filtering material with integrated particle and/or aerosol protection and with protective performance with regard to biological and/or chemical noxiants, in particular biological and/or chemical warfare agents, as classified in the preamble of claim 1 and to its use, in particular for producing protective materials of any kind, in particular NBC protective apparel, and also filters and filtering materials of any kind. The present invention further relates to the protective materials, in particular protective apparel (for example NBC protective garments), and also filters and filtering materials themselves that are produced using the adsorptive filtering material of the present invention.

There are a number of entities which are absorbed by the skin and lead to serious physical noxae. Examples include the vesicatory Hd (also known as Yellow Cross and mustard gas) and the nerve gas sarin. People liable to come into contact with such poisons have to wear a suitable protective suit, or be protected against these poisons by suitable protective materials.

There are in principle three types of protective suits: the air and water vapor impervious protective suits, which are equipped with a rubber layer which is impervious to biological and chemical poisons, and very rapidly lead to a heat build-up for the wearer; protective suits equipped with a membrane which transmits water vapor but not biological and chemical poisons; and air and water vapor pervious protective suits, which offer the highest wear comfort.

NBC protective apparel is thus traditionally produced either from impermeable systems (for example suits from butyl rubber or suits with membrane) or permeable, air pervious adsorptive filtering systems in particular based on activated carbon (for example pulverulent carbon, activated carbon fiber materials or spherocarbon, etc.).

Whereas the air impervious membrane suits lead on the one hand to relatively good protection against chemical and biological poisons such as warfare agents or the like, and on the other, owing to the air imperviousness or impermeability of the membrane, also offer protective performance with regard to aerosols and noxiant particles, the permeable, air pervious adsorptive protective suits do offer very good protection in relation to chemical poisons, but often only inadequate protection in relation to aerosols and noxiant particles.

To improve biological protection, the permeable, adsorptive filtering systems, in particular based on activated carbon, are often endowed with a catalytically active component, or a catalyst, by impregnating the activated carbon with a biocidal or biostatic catalyst, in particular based on metals or metal compounds. However, this does not solve the problem of poor protective performance with regard to noxiant aerosols (for example finely dispersed chemical noxiants, in particular warfare agents) or noxiant particles (for example noxiant microorganisms or microorganisms fixed on carrier particles, for example viruses or bacteria used as biological warfare agents).

The present invention therefore has for its object to provide an adsorptive filtering material, or a protective material, that at least substantially avoids or else at least ameliorates the above-described disadvantages of the prior art. In particular, such an adsorptive filtering or protective material should be suitable in particular for the production of NBC protective materials of any kind, for example NBC protective apparel and the like, and also of filter and filtering materials.

The present invention further has for its object to provide a permeable, in particular gas or air pervious adsorptive filtering or protective material which provides protection not only in relation to chemical and/or biological poisons or noxiants, in particular chemical warfare agents, but also with regard to noxiant particles and/or aerosols.

The problem described above is solved in the realm of the present invention by an adsorptive filtering material according to claim 1. Further, advantageous embodiments of the adsorptive filtering material of the present invention form the subject matter of the respective subclaims.

The present invention further provides for the use of the adsorptive filtering material according to the present invention for producing protective materials of any kind, in particular protective apparel, in particular for the civil or military sector, such as protective suits, protective gloves, protective shoewear, protective socks, head protective apparel and the like, and of protective coverings of any kind, preferably for NBC deployment, and also to the thus produced protective materials of the aforementioned kind themselves.

The present invention finally provides for the use of the adsorptive filtering material according to the present invention for producing filters and filtering materials of any kind, in particular for removing noxiant, odorant and toxicant entities of any kind, in particular from air and/or gas streams, such as NBC respirator filters, odor filters, sheet filters, air filters, in particular filters for indoor air cleaning, adsorption-capable support structures and filters for the medical sector and also the thus produced filter and filtering materials of the aforementioned kind themselves.

The present invention accordingly provides—in accordance with a first aspect of the present invention—an adsorptive filtering material with integrated particle and/or aerosol protection (i.e. with integrated particle and/or aerosol filtering function) and with protective performance with regard to biological and/or chemical noxiants, in particular biological and/or chemical warfare agents, the adsorptive filtering material having a multilayered construction, the multilayered construction comprising a support layer (i.e. a carrier layer), an adsorptive layer associated to and preferably fixed to the support layer, and optionally, a covering layer disposed on that side of the adsorptive layer that is remote from the support layer, wherein the adsorptive filtering material is additionally equipped with a particle- and/or aerosol-filtering layer, preferably a particle- and aerosol-filtering layer.

It is thus a fundamental idea of the present invention to equip adsorptive filtering materials of multilayered construction with an additional particle and/or aerosol protective function integrated in the adsorptive filtering material by including or incorporating in the adsorptive filtering material a particle- and/or aerosol-filtering layer, preferably particle and aerosol filtering layer, which itself is a constituent of the adsorptive filtering material as such.

In general, the particle- and/or aerosol-filtering layer is disposed between the adsorptive layer and the covering layer (i.e. the layer which in the use state is the outer or outside layer, for example an outerwear fabric), i.e. the particle- and/or aerosol-filtering layer is generally disposed on that side of the adsorptive layer that is remote from the support (carrier) layer. In the use state of the adsorptive filtering material according to the present invention, the covering layer is the outside layer (for example outerwear fabric) which faces the noxiant side, so that the noxiant-containing stream of, for example, biological and/or chemical warfare agents which is to be decontaminated first passes through the covering layer and then impinges upon the particle- and/or aerosol-filtering layer, whereby particles and/or aerosols are retained, and then the chemical and/or biological noxiants, in particular warfare agents, still remaining in the stream impinge on the subsequent adsorptive layer whereby they are then adsorbed and rendered harmless.

In principle, the particle- and/or aerosol-filtering layer, preferably combined particle and aerosol filtering layer, disposed between the adsorptive layer and the covering layer can either be laminated to the inside surface of the covering layer, or else be disposed loosely and unconnectedly between the covering layer and the adsorptive layer. In accordance with a further alternative, the particle- and/or aerosol-filtering layer is fixed on the adsorptive layer, for example by preferably discontinuous adhering.

Owing to the aforementioned multilayered construction, the adsorptive filtering material of the present invention combines in a single material not only an efficient particle and/or aerosol protection but also an efficient protection with regard to biological and/or chemical noxiants, in particular biological and/or chemical warfare agents.

The protective performance offered by the adsorptive filtering material of the present invention with regard to particles and aerosols is comparable to conventional membrane systems; but the gas perviousness, in particular air perviousness, or permeability, of the adsorptive filtering material of the present invention means that the wear comfort of NBC protective suits made thereof is distinctly enhanced compared with membrane suits.

The particle- and/or aerosol-filtering layer is generally constructed as a textile fabric, preferably an air pervious textile material. Examples of textile fabrics useful as particle- and/or aerosol-filtering layer are woven fabrics, knitted fabrics, laid fabrics and bonded fabrics, in particular nonwovens. Particular preference is given to nonwovens or nonwoven fabrics.

The term nonwovens or nonwoven fabrics herein refers in particular to the flexible, porous fabrics classified as bonded fabrics in that they are not produced by the classic methods of interweaving of warp and weft or by interlooping, but by intertanglement and/or cohesive and/or adhesive interbonding of textile fibers. Nonwovens are generally looser materials composed of staple fibers or filaments, in particular synthetic (manufactured) fibers (for example polypropylene, polyester, viscose, etc.) whose coherency is generally due to the fibers' autoadhesion. The individual fibers can have a preferential direction (so-called oriented or crosslaid nonwovens) or else be undirected (so-called random nonwovens). Nonwovens can be mechanically consolidated by needling, intermeshing or by entangling using sharp jets of water (so-called spunlaced nonwovens). Nonwovens particularly useful for the purposes of the present invention can be produced for example by spunbonding, meltblow processes and preferably by electrospinning (cf. for example U.S. Pat. No. 6,641,773 B2). Adhesively consolidated nonwovens are formed by interadhering the fibers with liquid binders (for example acrylate polymers, SBR/NBA, polyvinyl esters or polyurethane dispersions) or by melting or dissolving so-called binder fibers mixed to the nonwoven in the course of its production. In cohesive consolidation, fiber surfaces are solubilized by suitable chemicals and conjoined by pressure or welded together at elevated temperature. Spunbonded nonwovens are fabrics formed by spinning and subsequent laying down, blowing or alluviating onto a transport belt. Nonwovens containing additional threads, wovens or formed-loop knits are deemed reinforced nonwovens. Owing to the multiplicity of available raw materials, possible combinations and techniques of improvement, nonwovens or nonwoven fabrics can be produced in a specific manner to have any desired properties specific to a particular purpose. Like all textiles, nonwoven fabrics or nonwovens can be subjected to the operations of textile dyeing and finishing. For further details concerning the concept of nonwovens and nonwoven fabrics reference may be made for example to Römpp Chemielexikon, 10th edition, Georg Thieme Verlag Stuttgart/New York, Volume 6, 1999, pages 4889/4890, headword: "Vliesstoffe", whose entire disclosure content, including the references cited therein, is hereby incorporated herein by reference.

The areal weight of the particle- and/or aerosol-filtering layer used in accordance with the present invention can vary within wide limits. The areal weight of the particle- and/or aerosol-filtering layer used in accordance with the present invention is generally in the range from 1 to 100 g/m$^2$ and in particular in the range from 5 to 50 g/m$^2$. More particularly, the particle- and/or aerosol-filtering layer should have an areal weight of not more than 100 g/m$^2$ and in particular of not more than 50 g/m$^2$. However, it may be preferable or necessary depending on a particular planned use or an individual case to deviate from the aforementioned values without leaving the realm of the present invention.

Particularly good particle and/or aerosol collection rates are achieved when the particle- and/or aerosol-filtering layer used is a textile fabric, preferably nonwoven, consisting of textile fibers having an average diameter of not more than 50 μm, in particular not more than 30 μm, preferably not more than 20 μm, more preferably not more than 10 μm, even more preferably not more than 5 μm and most preferably not more than 2 μm. In general, the diameter of the textile fibers of which the textile fabric forming the particle- and/or aerosol-filtering layer consists should be in the range from 0.05 to 50 μm, in particular 0.1 to 50 μm, preferably 0.2 to 30 μm, more preferably 0.2 to 20 μm and most preferably 0.5 to 10 μm. Suitable textile fabrics, in particular nonwovens, having the aforementioned textile fiber diameters are obtainable for example in the meltblow or preferably in the electrospinning process.

In particular, the particle- and/or aerosol-filtering layer is constructed as a textile fabric consisting of textile fibers and having pores or meshes bounded by the textile fibers. The individual textile fibers thus bound the meshes (in the case of wovens for example) or pores (in the case of nonwovens for example). The textile fabric should have an average pore size or mesh size—depending on the nature of the textile fabric—of not more than 200 μm, in particular not more than 100 μm, preferably not more than 75 μm, more preferably not more than 50 μm and most preferably not more than 40 μm. This provides a particularly good collection rate in relation to particles and/or aerosols to be rendered harmless.

As Applicant has surprisingly found, the performance capability of the particle- and/or aerosol-filtering layer when the particle- and/or aerosol-filtering layer is a textile fabric of the aforementioned kind as consists of textile fibers and has pores or meshes bounded by textile fibers is decisively dependent also on the ratio of the average pore or mesh size to the average diameter of the textile fibers. In general, the ratio of the average pore or mesh size to the average diameter of the textile fibers should be in the range from 0.1 to 2000, in particular in the range from 1 to 500, preferably in the range from 5 to 350, more preferably in the range from 10 to 300 and most preferably in the range from 25 to 250. In particular, the ratio of the average pore or mesh size to the average diameter of the textile fibers should be not more than 2000, in particular not more than 500, preferably not more than 350, more preferably not more than 300 and most preferably not more than 250. However, the ratio of the average pore or mesh size to the average diameter of the textile fibers should be at least 0.1, in particular at least 1, preferably at least 5, more preferably at least 10, even more preferably at least 25 and yet even more preferably at least 40. This provides particularly efficient collection rates in relation to the particles and aerosols that are to be rendered harmless.

As observed above, the particle- and/or aerosol-filtering layer is generally a textile fabric consisting of textile fibers and preferably is a nonwoven. The textile fibers used may comprise natural and/or synthetic fibers, preferably synthetic fibers (also referred to by the synonym of manufactured fibers). Textile fibers which are suitable in accordance with the present invention and of which the textile fabric forming the particle- and/or aerosol-filtering layer consists are for example selected from the group of polyesters (PES); polyolefins, such as polyethylene (PE) and polypropylene (PP), polyvinyl chloride (CLF); polyvinylidene chloride (CLF); acetate (CA); triacetate (CTA); polyacrylic (PAN), polyamide (PA); polyvinyl alcohol (PVAL); polyurethanes; polyvinyl esters; (meth)acrylates; and also mixtures thereof. The aforementioned codes for the textile fibers come from German Standard Specification DIN 60001-4 (August 1991).

For further details concerning the concept of textile fibers, reference may be made for example to Römpp Chemielexikon, loc. cit., pages 4477 to 4479, headword: "Textilfasern", whose entire disclosure content, including the references cited therein, is hereby incorporated herein by reference. In particular, the term textile fibers is herein to be understood as a collective designation for all fibers capable of being subjected to textile processing; a feature common to textile fibers is a considerable length in relation to their cross section, and also sufficient strength and flexibility, although textile fibers can be assigned to different groups according to origin or material constitution.

To achieve an efficient collection rate in relation to the particles and/or aerosols to be rendered harmless, the particle- and/or aerosol-filtering layer should have a DIN EN 779 (July 1993) mean natural dust efficiency $E_m$ of at least 40%, in particular at least 50%, preferably at least 70%, more preferably at least 90% and most preferably at least 95%. Furthermore, the particle- and/or aerosol-filtering layer should have for this purpose a DIN EN 779 (July 1993) mean synthetic dust efficiency $A_m$ of at least 50%, in particular at least 70%, preferably at least 90%, more preferably at least 95% and most preferably at least 99%.

The DIN EN 779 standard of July 1993 concerns the requirements, testing and labelling of particle air filters for general indoor air technology. According to this prescription, the mean synthetic dust efficiency $A_m$ is determined by a gravimetric test method involving repeated dusting of the specimen with a known amount of a standardized artificial test dust in flowing air up to a maximum final pressure drop of 250 Pa, the efficiency being determined in each case from the mass ratios, by weighing a suspended matter filter downstream of the specimen, the mean synthetic dust efficiency $A_m$, calculated from all individual measurements, being applicable; for further details in this regard reference may be made to the text of DIN EN 779. The mean natural dust efficiency $E_m$, by contrast, is measured according to DIN 779 by means of a discoloration test method by repeated measurement of the efficiency with regard to natural atmospheric dust in the air, the specimen having been subjected to a first measurement in the virgin state being loaded with a known amount of standardized artificial test dust in accordance with DIN EN 779 and, thereafter, the efficiency being determined again until a final pressure drop of 450 Pa is reached, the measurement of the efficiency being based on the comparison of those test air volumes which have to be sucked, up- and down-stream the specimen, through a white suspended matter filter paper each until these are equally discoloured or cloudy, the mean natural dust efficiency $E_m$, calculated from all individual measurements, being applicable; for further details in this regard reference may be made to the text of DIN EN 779.

To achieve good particle and aerosol collection, moreover, the DIN EN 1822 (April 1989; DEHS aerosol, MPPS=0.1 to 0.3 μm) cumulative initial transmissivity $D_i$ of the particle- and/or aerosol-filtering layer should be not more than 50%, in particular not more than 40%, preferably not more than 30%, more preferably not more than 20% and most preferably not more than 10%. The test method of DIN EN 1822 is carried out on uncontaminated specimens with a liquid test aerosol (DEHS=diethylhexyl sebacate), based on measurements for a particle diameter which in each case corresponds to the most penetrating particle size MPPS, here: 0.1 to 0.3 μm). In a first step of the investigation, MPPS is determined on flat samples of the filtering medium, the subsequent evaluation and classification of the filters only being done on the basis of the MPPS. In a second step, the integral permeance $D_i$ is then determined, via the blowout area, for the MPPS and the pressure drop of the filter, both in the nominal volume stream. For further details in this regard reference may be made to the text of DIN EN 1822.

Advantageously, the particle- and/or aerosol-filtering layer is constructed such that it has a mean collection rate of at least 80%, in particular at least 90%, preferably at least 95% with regard to particles and/or aerosols having diameters in the range from 0.1 to 0.3 μm at an inflow speed of 0.1 μm/s.

Furthermore, the particle- and/or aerosol-filtering layer should have a mean collection rate of at least 95%, in particular at least 98%, preferably at least 99% with regard to particles and/or aerosols having diameters ≧2 μm and in particular ≧1.5 μm at an inflow speed of 0.1 m/s.

The thickness of the particle- and/or aerosol-filtering layer should be in the range from 0.001 to 10 mm, in particular in the range from 0.1 to 5 mm and preferably in the range from 0.01 to 1 mm.

In a particular embodiment, the particle- and/or aerosol-filtering layer can be constructed as a high efficiency penetration or particulate air (HEPA) filter or as an ultra low penetration or particulate air (ULPA) filter.

To ensure good gas perviousness, in particular air perviousness, for the present invention's adsorptive filtering material as a whole and thus a high wear comfort on processing into NBC protective suits, the particle- and/or aerosol-filtering layer should have a good gas perviousness, in particular air perviousness. In general, the gas perviousness, in particular air perviousness, of the particle- and/or aerosol-filtering layer should be at least 10 l·m$^{-2}$·s$^{-1}$, in particular at least 30 l·m$^{-2}$·s$^{-1}$, preferably at least 50 l·m$^{-2}$·s$^{-1}$, more preferably at least 100 l·m$^{-2}$·s$^{-1}$ and most preferably at least 400 l·m$^{-2}$·s$^{-1}$ or more at a flow resistance of 127 Pa.

The adsorptive layer envisaged according to the present invention may be constructed in principle of any desired adsorption-capable material suitable in the realm of the present invention's adsorptive filtering material.

In an embodiment preferred according to the present invention, the adsorptive layer is constructed on the basis of activated carbon, i.e. the adsorption-capable layer comprises or consists of activated carbon. The activated carbon may be present in the form of activated carbon particles and/or activated carbon fibers.

For example, the adsorptive layer may comprise or consist of discrete particles of activated carbon, preferably in granule form ("granulocarbon") or spherical form ("spherocarbon"). In particular, in this case, the average diameter of the activated carbon particles is <1.0 mm, preferably <0.8 mm and more preferably <0.6 mm. The average diameter of the activated carbon particles is in particular at least 0.1 mm. In this embodiment, the activated carbon particles can be used in an amount (i.e. loading or add-on amount) of 10 to 500 g/m$^2$, in particular 25 to 400 g/m$^2$, preferably 50 to 300 g/m$^2$, more preferably 75 to 250 g/m$^2$ and even more preferably 80 to 200 g/m$^2$. In particular, such activated carbon particles are used that have a bursting pressure of 5 newtons, in particular at least 10 newtons, and/or up to 20 newtons, based on an individual particle of activated carbon, in particular activated carbon granule or spherule.

Alternatively, however, the adsorptive layer may also be formed of activated carbon fibers, in particular in the form of an activated carbon fabric, or comprise activated carbon fibers. This embodiment utilizes in particular activated carbon fabrics having areal weights in the range from 10 to 300 g/m$^2$, in particular in the range from 20 to 200 g/m$^2$ and preferably in the range from 30 to 150 g/m$^2$. Useful activated carbon fiber fabrics for the purposes of the present invention include for example woven, loop-formingly knitted, laid or bonded activated carbon fiber fabrics, in particular on the basis of carbonized and activated cellulose and/or on the basis of carbonized and activated acrylonitrile.

It is similarly possible to form the adsorptive layer by combining activated carbon particles on the one hand and activated carbon fibers on the other.

It is preferable according to the present invention when the activated carbon used for forming the adsorptive layer (i.e. the particles or fibers of activated carbon) have an internal surface area (BET) of at least 800 m$^2$/g, in particular of at least 900 m$^2$/g, preferably of at least 1000 m$^2$/g and more preferably in the range from 800 to 2500 m$^2$/g.

To enhance the adsorptive efficiency and adsorptive performance, in particular to obtain an enhanced or improved protective performance also with regard to biological noxiants, in particular biological warfare agents, it is possible for the adsorptive layer, in particular the activated carbon particles and/or the activated carbon fibers, to be impregnated with at least one catalyst. Useful catalysts for the purposes of the present invention include for example enzymes and/or metals, preferably metals, in particular from the group of copper, silver, cadmium, platinum, palladium, rhodium, zinc, mercury, titanium, zirconium and/or aluminium, preferably in the form of the corresponding metal ions. The amount of catalyst can vary within wide limits; in general, it is in the range from 0.05% to 12% by weight, preferably in the range from 1% to 10% by weight and more preferably in the range from 2% to 8% by weight, based on the weight of the adsorptive layer. Any biological noxiants which have permeated through the aerosol and/or particle filtering layer can thereby be rendered harmless in an effective manner.

As written above, the adsorptive layer is fixed or secured to the support layer. In general, the securing of the adsorptive layer to the support layer is effected by means of an adhesive, which is advantageously applied atop the support layer only discontinuously or in point form in order that good gas perviousness, in particular air perviousness, may be retained for the support layer and thereby for the adsorptive filtering material as a whole. The adhesive should be applied in an add-on of 10 to 80 g/m$^2$, in particular 20 to 60 g/m$^2$ and preferably 30 to 50 g/m$^2$. Advantageously, the adhesive is applied such that advantageously not more than 50% of the surface of the support layer, preferably not more than 40% of the surface of the support layer, more preferably not more than 30% of the surface of the support layer and most preferably not more than 25% of the surface of the support layer is covered with adhesive. In general, the adhesive is applied atop, or printed onto, the support layer in the form of a regular or irregular grid in the form of points of adhesive, and subsequently the adsorptive layer (discrete particles of activated carbon for example) are then made to bond at the points of adhesive.

The support layer can in principle be any textile fabric, preferably any air pervious textile material. Preference is given to textile wovens, knits, laids or bondeds, in particular nonwovens. In general, the support layer has an areal weight of 20 to 200 g/m$^2$, in particular 30 to 150 g/m$^2$ and preferably 40 to 120 g/m$^2$.

The covering layer optionally envisaged according to the present invention is generally similarly constructed as a textile fabric, preferably an air pervious textile material, for example as a woven, knitted, laid or bonded fabric, in particular a nonwoven. In general, the support layer has an areal weight of 50 to 300 g/m$^2$, in particular 75 to 275 g/m$^2$, preferably 100 to 250 g/m$^2$ and more preferably 120 to 250 g/m$^2$.

To improve aerosol protection in particular, the covering layer can be, in particular on its outside surface, oleophobicized and/or hydrophobicized, preferably oleophobicized and hydrophobicized, preferably by an appropriate impregnation. In the event that comparatively large drops of noxiant and toxicant agents land on the covering layer, the oleophobicization and/or hydrophobicization of the surface of the covering layer can cause them to become distributed over the surface of the adsorptive filtering material of the present invention. Oleo- and hydrophobicizing agents suitable for this purpose will be well known to one skilled in the art (for example fluoropolymers, such as fluorocarbon resins etc.).

To improve in particular the aerosol protection and the protection with regard to biological noxiants, the covering layer and/or the support layer, preferably the support layer, may be provided with a biocidal and/or biostatic finish based on a catalytically active component (cf. commonly assigned German Patent Application DE 10 2005 056 537 and German Utility Model Application DE 20 2005 018 547, whose entire disclosure content in this regard is hereby incorporated herein by reference); especially finishing the support layer which serves as a support (carrier) for the adsorptive layer and in the flow direction follows on the covering layer and the aerosol/particle filtering layer, with a biocidally or biostatically effective catalytically active component provides an effective way of rendering harmless any biological noxiants that have succeeded in permeating through the advantageously oleophobicized and/or hydrophobicized covering layer and the, in the flow direction, subsequent aerosol and/or particle filtering layer. The biocidally or biostatically effective catalytically active component may be in particular incorporated in the covering and/or support layers, each preferably constructed as a textile fabric, preferably only in the support layer, in particular in the fibers, threads, yarns, filaments or the like that form the fabric, examples of the incorporating being spinning, extruding, impregnating, chemical and plasma-chemical treating processes or the like. Useful biocidally or biostatically effective catalytically active components include in particular metals or metal compounds, in particular from the group of copper, silver, cadmium, platinum, palladium, rhodium, zinc, mercury, titanium, zirconium and/or aluminium and also their ions and/or salts, preferably copper and silver and also their ions and/or salts, more preferably from the group of Ag, $Ag_2O$, Cu, $Cu_2O$ and CuO and also mixtures thereof. The amount of catalytically active component, based on the overall layer, can vary in the range from 0.001% to 20% by weight, in particular in the range from 0.005% to 10% by weight and preferably in the range from 0.01% to 5% by weight. Textile fabrics useful for the purposes of the present invention as having a catalytically active component with a biostatic or biocidal action applied to them are commercially available, for example from Cupron Corporation, New York (USA), Foss Manufacturing Company Inc., Hampton, N.H. (USA) or Noble Fiber Technologies, Clarks Summit, Pa. (USA).

The covering layer may further be rendered flame retardant (by means of phosphoric ester impregnation for example). The covering layer may also be rendered antistatic. In a further embodiment, the covering layer may also have infrared (IR) reflective properties. Finally, the covering layer may also be provided with a camouflage print, in particular when used to produce NBC protective suits, on its noxiant-remote side (i.e. on the outside surface in the use state).

In general, the support layer and/or the covering layer may be a textile fabric consisting of natural and/or synthetic fibers, preferably of synthetic (manufactured) fibers. Synthetic (manufactured) fibers useful for forming the covering layer and/or support layer are for example selected from the group of polyamides, polyesters, polyolefins (for example polyethylenes or polypropylenes), polyurethanes, polyvinyl and/or polyacrylic.

As well as the aforementioned layers, the adsorptive filtering material of the present invention may contain still other layers, in particular textile plies. These can be disposed above, below or between the aforementioned layers.

As written above, the adsorptive filtering material of the present invention is gas pervious, in particular air pervious, and/or water pervious and/or water vapor pervious. This provides excellent wear comfort on processing into NBC protective suits.

In general, the adsorptive filtering material of the present invention has a gas or air transmission rate of at least 10 $l·m^{-2}·s^{-1}$, in particular at least 30 $l·m^{-2}·s^{-1}$, preferably at least 50 $l·m^{-2}·s^{-1}$, more preferably at least 100 $l·m^{-2}·s^{-1}$ and most preferably at least 400 $l·m^{-2}·s^{-1}$, and/or up to 10 000 $l·m^{-2}·s^{-1}$ at a flow resistance of 127 Pa. Since the gas or air perviousness of the adsorptive filtering material according to the present invention is at least essentially determined or restricted by the aerosol and/or particle filtering layer, the gas or air perviousness of the adsorptive filtering material of the present invention as a whole corresponds essentially to the gas or air perviousness of the aerosol and/or particle filtering layer.

In general, the adsorptive filtering material of the present invention has an overall areal weight in the range from 200 to 1000 $g/m^2$, in particular in the range from 225 to 800 $g/m^2$, preferably in the range from 250 to 600 $g/m^2$ and more preferably in the range from 300 to 500 $g/m^2$, in particular when coupled with an overall cross-sectional thickness of 0.1 to 10 mm, in particular 0.2 to 5 mm and preferably 0.5 to 3.0 mm for the adsorptive filtering material of the present invention.

To enhance the wear comfort on processing of the adsorptive filtering material of the present invention into NBC protective apparel, the adsorptive filtering material of the present invention should have a water vapor transmission rate of at least 5 $l/m^2$ per 24 h, in particular at least 10 $l/m^2$ per 24 h, preferably at least 15 $l/m^2$ per 24 h, more preferably at least 20 $l/m^2$ per 24 h and most preferably at least 25 $l/m^2$ per 24 h. The water vapor transmission rate can be measured by the inverted cup method of ASTM E 96 and at 25° C. For further details concerning the measurement of the water vapor transmission rate (WVTR) reference is made to McCullough et al. "A Comparison of Standard Methods for Measuring Water Vapor Permeability of Fabrics" in *Meas. Sci. Technol. [Measurements Science and Technology]*, 14, 1402-1408, August 2003. This ensures good wear comfort.

To ensure a good protective effect with regard to chemical warfare agents, the adsorptive filtering material of the present invention generally has a barrier effect with regard to chemical warfare agents, in particular bis[2-chloroethyl]sulphide (also known as mustard gas, Hd or Yellow Cross), determined by method 2.2 of CRDEC-SP-84010, permitting permeation of not more than 4 $\mu g/cm^2$ per 24 h, in particular not more than 3.5 $\mu g/cm^2$ per 24 h, preferably not more than 3.0 $\mu g/cm^2$ per 24 h and more preferably not more than 2.5 $\mu g/cm^2$ per 24 h.

Further advantages, properties, aspects and features of the present invention will become apparent from the following description of an illustrative embodiment depicted in the figures.

BRIEF SUMMARY

An adsorptive filtering material is disclosed which is endowed with integrated particle- and/or aerosol-protection and with protective performance with regard to biological and/or chemical noxiants, in particular biological and/or chemical warfare agents, the adsorptive filtering material having a multilayered construction comprising a support layer, an adsorptive layer associated to and preferably fixed to the support layer, and optionally a covering layer disposed on that side of the adsorptive layer that is remote from the support layer, wherein the adsorptive filtering material is additionally equipped with a particle- and/or aerosol-filtering layer. The adsorptive filtering material is particularly useful in NBC protective materials of any kind (as in protective apparel for example) and for producing filters.

One object of the present disclosure is to describe an improved adsorptive filtering material.

DETAILED DESCRIPTION

Figure 1:
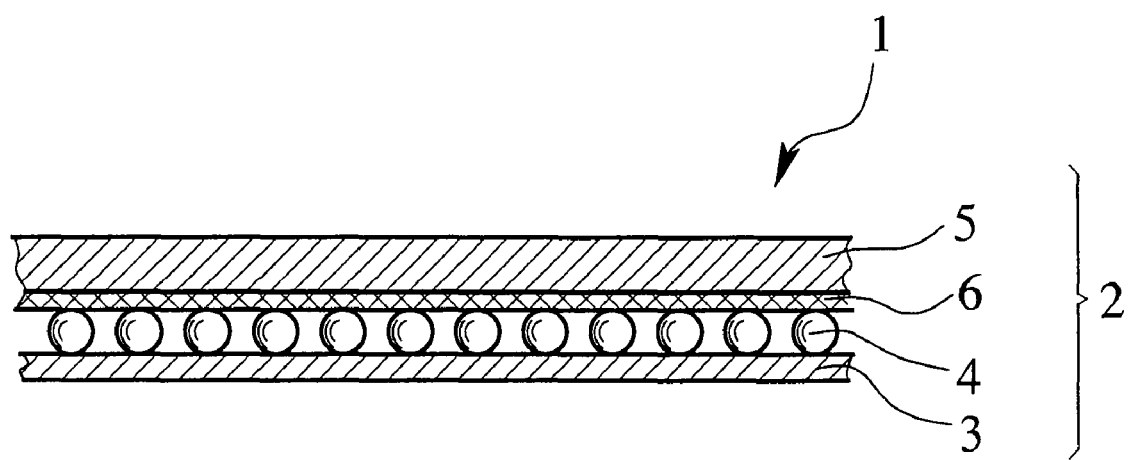
FIG. 1 is a schematic sectional depiction through the layered construction of an inventive adsorptive filtering material in accordance with an embodiment of the present invention.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

The sole FIGURE (FIG. 1) shows a schematic sectional depiction through the layered construction 2 of an inventive adsorptive filtering material 1 corresponding to a specific embodiment of the present invention. The inventive adsorptive filtering material 1 according to the present invention, which is equipped both with an integrated particle and/or aerosol protection but also with a protective function with regard to biological and/or chemical noxiants, in particular biological and/or chemical warfare agents, has a multilayered construction 2 comprising a support layer 3, an adsorptive layer 4 associated to and preferably fixed to the support layer 3, and a covering layer 5 disposed on that side of the adsorptive layer 4 that is remote from the support layer 3. In addition, the adsorptive filtering material 1 is equipped with a particle- and/or aerosol-filtering layer 6, preferably a combined particle and aerosol filtering layer 6.

In an embodiment preferred according to the present invention, the particle- and/or aerosol-filtering layer 6 is disposed between the adsorptive layer 4 and the covering layer 5, i.e. the particle- and/or aerosol-filtering layer 6 is disposed on that side of the adsorptive layer 4 that is remote from the support layer 3. In the use state, the noxiants, including the aerosols and particles, that are to be rendered harmless thus initially, after passing through the outer covering layer 5, impinge on the particle- and/or aerosol-filtering layer 6 where the noxiant particles and aerosols in question are rendered harmless, and the noxiant stream which may still contain chemical and/or biological noxiants after it has been freed of the particles and aerosols then finally impinges on the adsorptive layer 4, where the remaining noxiants are then rendered harmless by adsorptive processes and, in the case of the presence of catalysts, additionally also by decomposition processes.

For further details in this regard concerning the inventive adsorptive filtering material 1 reference can be made to the above observations.

The present invention further provides for the use of the present invention's adsorptive filtering material as previously described for producing protective materials of any kind, in particular protective apparel, in particular for the civil or military sector, such as protective suits, protective gloves, protective shoewear, protective socks, head protective apparel and the like, and of protective coverings of any kind, preferably all aforementioned protective materials for NBC deployment.

The present invention further provides for the use of the present invention's adsorptive filtering material as previously described for producing filters and filtering materials of any kind, in particular for removing noxiant, odorant and toxicant entities of any kind, in particular from air and/or gas streams, such as NBC respirator filters, odor filters, sheet filters, air filters, in particular filters for indoor air cleaning, adsorption-capable support structures and filters for the medical sector.

The present invention also provides the aforementioned protective materials of any kind themselves, in particular for the civil or military sector, in particular protective apparel, such as protective suits, protective gloves, protective shoewear, protective socks, head protective apparel and the like, and protective coverings, produced using the adsorptive filtering material according to the present invention and/or comprising the adsorptive filtering material according to the present invention, preferably all aforementioned protective materials for NBC deployment.

The present invention finally further provides filters and filtering materials of any kind, in particular for removing noxiant, odorant and toxicant agents of any kind, in particular from air and/or gas streams, such as NBC respirator filters, odor filters, sheet filters, air filters, in particular filters for indoor air cleaning, adsorption-capable support structures and filters for the medical sector, produced using the material according to the present invention and/or comprising the adsorptive filtering material according to the present invention.

For further details concerning the above-described uses according to the present invention and concerning the above-described articles according to the present invention, reference can be made to the above observations concerning the present invention's adsorptive filtering material which apply mutatis mutandis in relation to the uses according to the present invention and the articles according to the present invention.

Further embodiments, modifications and variations of the present invention are readily discernible and realizable for those skilled in the art on reading the description without their having to leave the realm of the present invention.

The present invention will now be illustrated with reference to the following Example which, however, shall not restrict the present invention in any way.

EXAMPLE

Four different adsorptive filtering materials were produced, namely three inventive adsorptive filtering materials with different particle and aerosol filtering layers each in the form of a nonwoven fabric and one comparative adsorptive filtering material without particle and aerosol filtering layer.

All the adsorptive filtering materials are produced by printing a textile support layer having an areal weight of about 100 g/m$^2$ with about 40 g/m$^2$ of an adhesive in the form of a point grid, to which adhesive activated carbon spherules having average diameters of about 0.3 mm are subsequently made to bond in an add-on amount of about 180 g/m$^2$.

After crosslinking and curing the adhesive, a textile covering layer having an areal weight of 150 g/m$^2$ is laminated onto the activated carbon layer in the case of the comparative adsorptive filtering material, whereas in the case of the three inventive adsorptive filtering materials a particle and aerosol filtering layer in the form of a nonwoven is provided between the activated carbon layer and the covering layer, the particle and aerosol filtering layer being laminated onto the inside surface of the outer covering layer in the case of all three inventive adsorptive filtering materials.

The particle and aerosol filtering layer used for all three inventive adsorptive filtering materials is a synthetic fiber nonwoven having an areal weight of about 40 g/m$^2$ and a pore diameter of below 100 μm coupled with an air perviousness of in each case about 400 l·m$^{-2}$·s$^{-1}$ at a flow resistance of 127 Pa.

In the case of the first, second and third adsorptive filtering materials of the invention, the average fiber diameter is about 10 μm, about 2 μm and about 0.5 μm, respectively, and the ratio of the average pore size of the nonwoven to the average diameter of the textile fibers is about 8, about 45 and about 180, respectively.

All four adsorptive filtering materials are tested for their barrier effect with regard to mustard gas by method 2.2 of CRDEC-SP-84010 as part of the convective flow test. For this purpose, an air stream containing mustard gas is allowed to flow at a constant flow resistance and at a flow velocity of about 0.45 cm/s against the adsorptive filtering material while the area-specific breakthrough quantity is determined after 16 hours (80% relative humidity, 32° C.). For all four adsorptive filtering materials, the breakthrough amount in relation to mustard gas is distinctly below 4 μg/cm$^2$, so that all the adsorptive filtering materials exhibit good protective performance with regard to chemical warfare agents.

Subsequently, all four adsorptive filtering materials are tested for their DIN EN 779 (July 1993) mean natural dust efficiency $E_m$ and for their DIN EN 779 (July 1993) mean synthetic dust efficiency $A_m$. The DIN EN 779 mean natural dust efficiency $E_m$ is about 66%, about 86%, about 92% and about 46% for the first (inventive), second (inventive), third (inventive) and fourth (comparative) adsorptive filtering materials, respectively; the DIN EN 779 (July 1993) mean synthetic dust efficiency $A_m$ is about 72%, about 89%, about 97% and about 45% for the first, second, third and fourth adsorptive filtering materials, respectively. This shows that the inventive adsorptive filtering materials provide good particle and aerosol protection which increases as the ratio of nonwoven average pore size to nonwoven textile fiber average diameter increases, whereas the inventive adsorptive filtering material has admittedly a certain particle and aerosol filtering protection that is distinctly below that of the inventive adsorptive filtering materials.

The four adsorptive filtering materials are further tested for their DIN EN 1822 (April 1998; DEHS aerosol, MPPS=0.1 to 0.3 µm) cumulative initial transmissivity $D_i$. The cumulative initial transmissivity $D_i$ is about 20%, about 15%, about 5% and about 88% for the first, second, third and fourth adsorptive filtering materials, respectively. Whereas the noninventive adsorptive filtering material is found to have, as expected, an insufficient cumulative initial transmissivity $D_i$, this value is sufficient for all three inventive adsorptive filtering materials, but found to improve increasingly as the ratio of the employed nonwoven's average pore size to the employed nonwoven's textile fibers' average diameter increases.

All three inventive adsorptive filtering materials, moreover, have a collection rate of above 95% with regard to particles and aerosols having diameters $\geq 1.5$ µm, whereas this collection rate is below 40% for the noninventive adsorptive filtering material.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A gas pervious adsorptive filtering material having integrated particle- and aerosol-protection and having protective performance with regard to biological and/or chemical noxiants, the adsorptive filtering material having a multilayered construction, the multilayered construction comprising:
   a support layer;
   an adsorptive layer that is associated to and fixed to the support layer,
   wherein the adsorptive layer comprises discrete particles of activated carbon in granule form or spherical form and wherein the adsorptive layer is fixed to the support layer by means of an adhesive, the adhesive being applied such that not more than 50% of the surface of the support layer is covered with the adhesive;
   a covering layer disposed on that side of the adsorptive layer that is remote from the support layer;
   wherein the adsorptive filtering material is additionally equipped with a gas pervious particle- and aerosol-filtering layer;
   wherein the particle- and aerosol-filtering layer is an airpervious nonwoven textile fabric having an areal weight in the range of from 1 to 100 g/m² and consisting of textile fibers and having pores bounded by the textile fibers;
   wherein the textile fabric has an average pore size of not more than 200 µm; and
   wherein the ratio of the average pore or mesh size to the average diameter of the textile fibers is in the range from 40 to 250.

2. The adsorptive filtering material according to claim 1, wherein the particle- and aerosol-filtering layer is disposed between the adsorptive layer and the covering layer and wherein the particle- and aerosol-filtering layer is disposed on that side of the adsorptive layer that is remote from the support layer.

3. The adsorptive filtering material according to claim 1, wherein the particle- and aerosol-filtering layer is a textile fabric consisting of textile fibers, the average diameter of the textile fibers being not more than 5 µm.

4. The adsorptive filtering material according to claim 1, wherein the particle- and aerosol-filtering layer is a textile fabric consisting of textile fibers and having pores bounded by the textile fibers, the textile fabric having an average pore size of not more than 40 µm.

5. The adsorptive filtering material according to claim 1, wherein the particle- and aerosol-filtering layer is a textile fabric consisting of textile fibers, said textile fibers comprising natural or synthetic fibers selected from the group consisting of polyesters (PES); polyolefins; polyvinyl chloride (CLF); polyvinylidene chloride (CLF); acetate (CA); triacetate (CTA); polyacrylic (PAN), polyamide (PA); polyvinyl alcohol (PVAL); polyurethanes; polyvinyl esters; (meth) acrylates; and mixtures thereof.

6. The adsorptive filtering material according to claim 1, wherein the particle- and aerosol-filtering layer has a mean collection rate of at least 80% with regard to particles and/or aerosols having diameters in the range from 0.1 to 0.3 µm at an inflow speed of 0.1 m/s.

7. The adsorptive filtering material according to claim 1, wherein the particle- and aerosol-filtering layer has a thickness in the range from 0.001 to 10 mm.

8. The adsorptive filtering material according to claim 1, wherein the particle- and aerosol-filtering layer has a mean collection rate of at least 90% with regard to particles and/or aerosols having diameters in the range from 0.1 to 0.3 µm at an inflow speed of 0.1 m/s.

9. The adsorptive filtering material according to claim 1, wherein the particle- and aerosol-filtering layer has a gas perviousness of at least $10 \, l \cdot m^{-2} \cdot s^{-1}$ at a flow resistance of 127 Pa.

10. The adsorptive filtering material according to claim 1, wherein the covering layer is oleophobicized and/or hydrophobicized.

11. A protective material for the civil or military sector, the protective material being selected from the group consisting of protective apparel, protective suits, protective gloves, protective shoewear, protective socks, head protective apparel and protective coverings and comprising the adsorptive filtering material according to claim 1.

12. A filter for removing noxiant, odorant and toxicant agents from air or gas streams, the filter comprising the adsorptive filtering material according to claim 1.

13. The filter of claim 12, the filter being selected from the group consisting of NBC respirator filters, odor filters, sheet filters, air filters, filters for indoor air cleaning, adsorption-capable support structures and filters for the medical sector.

14. The adsorptive filtering material according to claim 1, wherein the particle- and aerosol-filtering layer has a mean collection rate of at least 95% with regard to particles and/or aerosols having diameters in the range from 0.1 to 0.3 µm at an inflow speed of 0.1 m/s.

* * * * *